US008458368B2

(12) United States Patent
Watkins (10) Patent No.: US 8,458,368 B2
(45) Date of Patent: Jun. 4, 2013

(54) SYSTEM AND METHOD FOR DISCOVERING AND PROTECTING SHARED ALLOCATED RESOURCES IN A SHARED VIRTUALIZED I/O DEVICE

(75) Inventor: John E. Watkins, Sunnyvale, CA (US)

(73) Assignee: Oracle America, Inc., Redwood City, CA (US)

(*) Notice: Subject to any disclaimer, the term of this patent is extended or adjusted under 35 U.S.C. 154(b) by 678 days.

(21) Appl. No.: 12/471,637

(22) Filed: May 26, 2009

(65) Prior Publication Data

US 2010/0306416 A1    Dec. 2, 2010

(51) Int. Cl.
*G06F 3/00* (2006.01)
*G06F 13/00* (2006.01)
*G06F 12/00* (2006.01)
*G06F 9/46* (2006.01)

(52) U.S. Cl.
USPC ............... 710/5; 710/1; 710/3; 710/4; 710/7; 710/36; 710/37; 710/104; 710/107; 710/241; 718/104

(58) Field of Classification Search
USPC ........ 710/3–7, 36, 37, 104, 107, 241; 706/57; 714/35, 44; 718/100, 103–104; 707/8; 709/102, 709/226
See application file for complete search history.

(56) References Cited

U.S. PATENT DOCUMENTS

| 4,727,487 | A * | 2/1988 | Masui et al. ............... 706/57 |
| 5,361,347 | A * | 11/1994 | Glider et al. ............... 714/44 |
| 6,493,354 | B1 * | 12/2002 | Hansquine et al. ......... 370/468 |
| 6,496,864 | B1 * | 12/2002 | McCartney ................ 709/226 |
| 6,594,698 | B1 * | 7/2003 | Chow et al. ............... 709/226 |
| 6,859,926 | B1 * | 2/2005 | Brenner et al. ............. 718/100 |
| 7,275,183 | B2 * | 9/2007 | Santos et al. .............. 714/35 |
| 7,334,076 | B2 * | 2/2008 | Hendel et al. ............. 711/6 |
| 2002/0165896 | A1 * | 11/2002 | Kim ...................... 709/102 |
| 2003/0037185 | A1 * | 2/2003 | Davis et al. .............. 710/1 |
| 2004/0167996 | A1 | 8/2004 | Takamura et al. |

(Continued)

OTHER PUBLICATIONS

U.S. Appl. No. 12/135,356, filed Jun. 9, 2008 Entitled: "System and Method for Discovering and Protecting Allocated Resources in a Shared Virtualized I/O Device" Inventor: John E. Watkins.
U.S. Appl. No. 12/355,856, filed Jan. 19, 2009; Entitled: "Method and System for Reducing Address Space for Allocated Resources in a Shared Virtualized I/O Device" Inventor: John E. Watkins.

*Primary Examiner* — Idriss N Alrobaye
*Assistant Examiner* — Henry Yu
(74) *Attorney, Agent, or Firm* — Meyertons, Hood, Kivlin, Kowert & Goetzel, P.C.; Stephen J. Curran (57) ABSTRACT

A system includes a virtualized I/O device coupled to one or more processing units. The virtualized I/O device includes programmed I/O (PIO) configuration registers corresponding to hardware resources, and a storage for storing a resource table that includes a plurality of entries. Each entry corresponds to a respective hardware resource. A system processor may allocate the hardware resources to functions that may include physical and virtual functions, and may program each entry of the resource discovery table for each function with an encoded value that indicates whether a requested hardware resource has been allocated to a requesting process, and whether the requested hardware resource is shared with another function. Processing units may execute a device driver instance associated with a given process to discover allocated resources by requesting access to the resource discovery table. The virtualized I/O device protects the resources by checking access requests against the resource discovery table.

20 Claims, 3 Drawing Sheets

U.S. PATENT DOCUMENTS

| | | | |
|---|---|---|---|
| 2005/0261857 A1* | 11/2005 | Jones et al. | 702/119 |
| 2006/0085794 A1* | 4/2006 | Yokoyama | 718/100 |
| 2008/0235695 A1* | 9/2008 | Itou | 718/103 |
| 2008/0288661 A1* | 11/2008 | Galles | 710/3 |
| 2008/0301690 A1* | 12/2008 | Do et al. | 718/104 |
| 2010/0057741 A1* | 3/2010 | Fincher et al. | 707/8 |

* cited by examiner

SYSTEM AND METHOD FOR DISCOVERING AND PROTECTING SHARED ALLOCATED RESOURCES IN A SHARED VIRTUALIZED I/O DEVICE

BACKGROUND OF THE INVENTION

1. Field of the Invention

This invention relates to computer systems and, more particularly, to shared input/output (I/O) resources.

2. Description of the Related Art

There have been significant increases in the effective throughput of a variety of I/O devices used in computing systems. In the recent past, a number of new communication standards have been introduced. For example, 10 Gigabit Ethernet may allow up to ten gigabits of information to be conveyed and Peripheral Component Interconnect Express (PCIe™) Generation 1 may allow up to 2.5 Gbits per lane. In many computer systems, a single processor or processing module typically does not use that much I/O bandwidth. Accordingly, in an effort to increase hardware resource utilization, sharing of I/O hardware resources may be desirable.

One mechanism for sharing resources that use PCIe interfaces is to virtualize the resources across multiple processing elements. Thus, I/O virtualization standards have been introduced, such as for example, the single root and multi-root PCIe specifications. However, there are issues with virtualizing and sharing hardware resources. For example, an I/O device that implements a PCIe interface uses the notion of a function. Functions may be used to access respective hardware resources. In some systems, some functions may need shared access to a given hardware resource. However, shared access may be problematic unless handled appropriately.

SUMMARY

Various embodiments of a system and method for discovering and protecting shared allocated resources in a shared virtualized input/output (I/O) device are disclosed. In one embodiment, the system includes a virtualized I/O device coupled to one or more processing units. The virtualized I/O device may include programmed I/O (PIO) configuration registers corresponding to hardware resources The system may also include a storage for storing a resource discovery table that includes a plurality of entries. Each entry corresponds to a respective hardware resource. A system processor may allocate the hardware resources to one or more functions such as, for example, physical and virtual functions. The system processor may also program each entry of the resource discovery table for each function with an encoded value that indicates whether a requested hardware resource has been allocated to a requesting process, and whether the requested hardware resource is shared with another function. Processing units may execute a device driver instance associated with a given process to discover allocated resources by requesting access to the resource discovery table. The virtualized I/O device protects the resources by checking access requests against the resource discovery table.

In another embodiment, a method includes system manager software executing on a processor allocating hardware resources to a plurality of functions. The functions may include physical functions and virtual functions. The system manager may also populate a resource discovery table for each function. Each resource discovery table includes a plurality of entries, each corresponding to a respective hardware resource. The method also includes an operating system assigning a function to a respective process executing on a processor. The method may also include a device driver associated with a given respective process discovering allocated hardware resources by requesting a read access to the resource discovery table of the corresponding function. Each entry of the resource discovery table includes an encoded value indicating whether a requested hardware resource has been allocated to the requesting process, and whether the requested hardware resource is shared with another function. The method may further include the device driver storing the results of the read access.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

As mentioned above, sharing of I/O hardware resources may be desirable in some systems. Thus, I/O virtualization standards have been introduced. However, there are issues with virtualizing and sharing of hardware resources. More particularly, one issue is the data and resources of each process must be protected from access by any other process. Another issue is that each process should have the perception that it is the sole user of the hardware resource. Thus, as described below, a virtualized I/O device may be used to share a relatively high cost hardware component among a number of user processes. In addition, using the virtualized I/O device, each process has a way to discover which resources have been allocated to it, and the data of each process is protected. Further, the virtualized I/O device may provide an environment in which each process may have little or no knowledge that it is sharing the hardware with another process, and each process may use an instance of a common device driver to discover and access allocated resources.

In addition, as mentioned above, some virtualization strategies may require a hierarchical access permission structure where certain device drivers, through their respective functions, can access the resources of a selected set of other functions. An example may be a system that is compliant with the latest version of The Single Root I/O Virtualization and Sharing Specification produced by the PCI Special Interest Group, which allows a physical function to access some or all of the resources of one or more of its subsidiary virtual functions. A second example may be a system where one function under the control of a host-based service processor is given total access to all resources. A third example where selective multiple access of a virtualized resource may be valuable is when that resource needs to be shared based on software protocols and not hardware access limited. This type of multiple access may be particularly useful for resources used for diagnostic mode access during development, for example. In such implementations, the hardware must allow this flexible access of virtualized resources and inform the function device driver as some access modes may use software protocol-based sharing.

Figure 1:
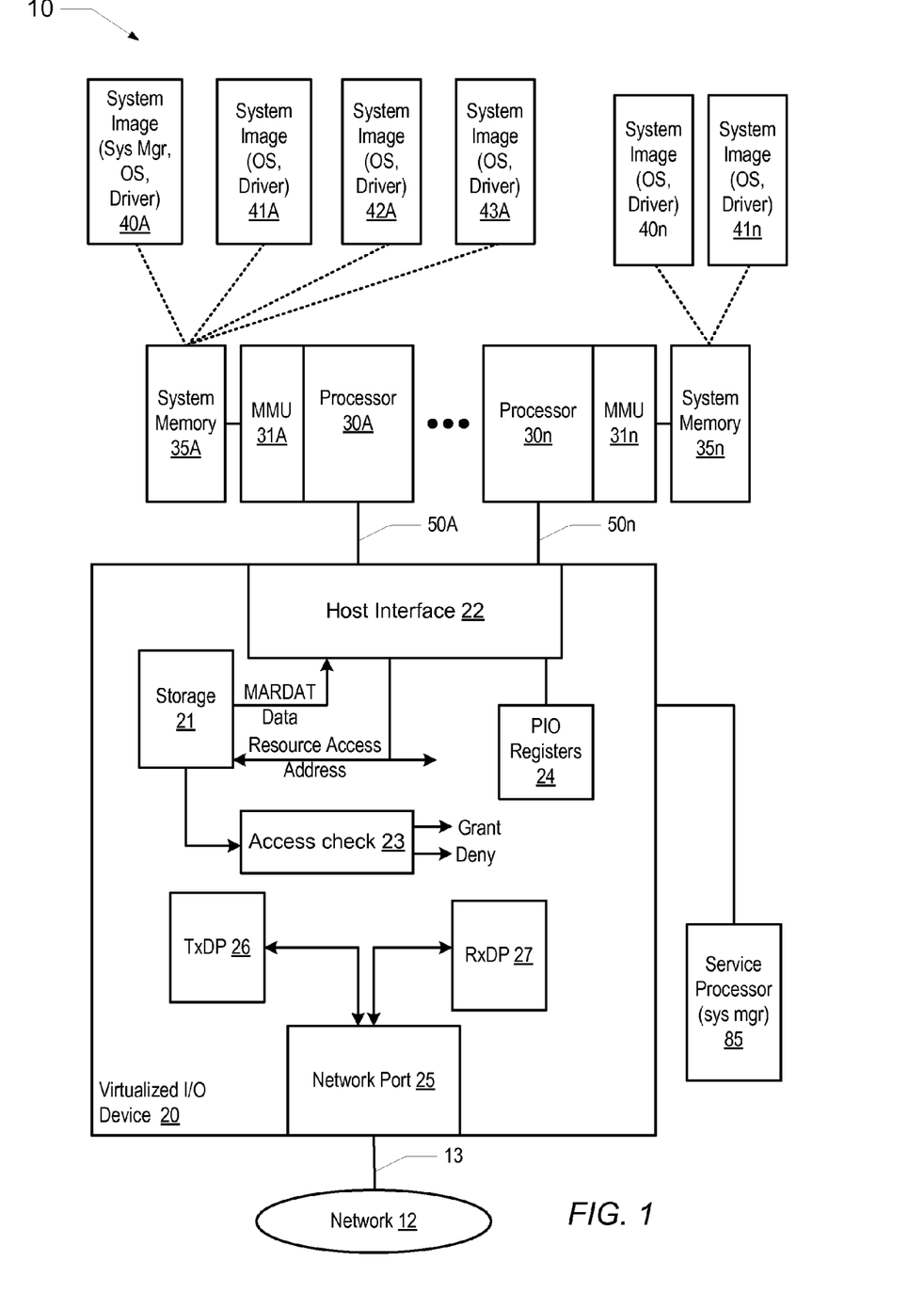
FIG. 1 is a block diagram of one embodiment of a computer system including a shared virtualized I/O device.

Turning now to FIG. 1, a block diagram of one embodiment of a computer system 10 including a virtualized I/O device 20 connected to a network 12 is shown. Computer system 10 includes a plurality of processors designated 30A and 30n, where n may be representative of any number. As shown, the processors 30A and 30n are coupled to the virtualized I/O device 20. The virtualized I/O device 20 is coupled to a network 12, and to a service processor 85. As shown, processor 30A is also coupled to a memory management unit, designated MMU 31A, which is in turn coupled to a system memory 35A. Similarly, processor 30n is coupled to MMU 31n and system memory 35n. It is noted that components having reference designators with a number and letter may be referenced by just the number where appropriate.

In one embodiment, each of the processors 30 may be representative of any type of processing unit including a single processor, a chip multiprocessor that includes multiple central processing units (CPUs) on a single substrate, or a processing node such as a blade processing unit or blade server, for example, which may include one or more CPUs in a single housing.

In the illustrated embodiment, the MMU 31 may be configured to control accesses to system memory 35A, as well as manage memory and policy for caching of a particular data type. Further, in one embodiment, MMU 31 may be configured to grant or deny accesses to certain addresses within a programmed I/O (PIO) configuration space by device drivers, dependent upon whether the requesting device driver has been allocated the requested address space.

System memory 35 may be representative of any type of memory medium. For example, in various embodiments, system memory 35 may be implemented using memory devices in the dynamic random access memory (DRAM) family of devices. However, system memory 35 may also be implemented using static RAM (SRAM) or other types of storage devices as desired. System memory 35 may be used to store program instructions, which may be fetched and executed by the processors 30A and 30n.

More particularly, as shown in FIG. 1, a number of system images designated 40A-43A may be stored within system memory 35A, and a number of system images designated 40n-41n may be stored within system memory 35n, as denoted by the dotted lines. Each of the system images may be representative of an instance of system software that is running on a given CPU within processor 30A. For example, the system image may include an operating system instance, a device driver instance, as well as any other system level software executing on a processing unit. In addition, there may be several instances of a device driver executing on a given CPU. For example, as described in greater detail below, a CPU may be running several processes, each requiring I/O hardware resources within the virtualized I/O device 20. In one embodiment, each of those processes may have its own device driver instance that may be used to discover and access the respective hardware resources that have been assigned to each respective process.

In the illustrated embodiment, the virtualized I/O device 20 includes a network port 25 that is coupled to the network 12 via a network link 13. The virtualized I/O device 20 also includes a host interface 22 that is coupled to PIO registers 24. The storage 21 is coupled to an access check unit 23. In addition, the virtualized I/O device 20 includes a transmit data path designated TxDP 26 and a receive datapath designated RxDP 27. In various embodiments, the RxDP 27 may include filtering and classification, and scheduling functionality, among others. The TxDP 26 circuits may include arbitration and scheduling functionality. It is noted that virtualized I/O device 20 may also include a variety of other circuits that have been omitted here for simplicity.

The network port 25 may provide a connection to the network 12 using a network protocol. In one embodiment, the network 12 may be any of a variety of frame-based protocols such as the Ethernet protocol. As such, the network connection may be a 10-Gigabit Ethernet (10 GE) connection. Accordingly, network port 25 may be configured to provide a cable or optical interface, as well as other network functions such as medium access control (MAC) functions, physical (PHY) layer functions, and physical coding sublayer (PCS) functionality (all not shown). It is noted that in other embodiments, other network protocols may be supported.

In one embodiment, the host interface 22 may include a plurality of I/O interfaces (not shown) that may be representative of Peripheral Component Interconnect (PCI) Express (PCIe™) compliant physical interfaces, each representing a PCIe endpoint. As such each of the links (e.g., 50A and 50n) may be PCIe links that include a number of lanes. In addition, each I/O interface may be independently configurable by the service processor 85. Further, the host interface 22 may provide a shared set of resources (e.g., MAC, statistics and control, DMA channels, PIO configuration space) that allow each processor 30 to substantially transparently share the network port 25. The PIO registers unit 24 includes number of configuration and status registers, and supports memory mapped I/O posted and non-posted transactions. Each link may be independently programmed and controlled by the processing unit 30 to which it is connected.

Accordingly, the virtualized I/O device 20 may provide a flexible number of I/O resources to a number of processes executing on the processing units 30. In one embodiment, the service processor 85 may determine and allocate the hardware resources of the virtualized I/O device 20 among the processes during an initialization of computer system 10. The virtualized I/O device 20 may be configured to provide a measure of protection for the allocated resources such that no process may either accidentally or otherwise access the resources that have been allocated to another process.

More particularly, to enable a device driver that has been assigned to a given process to discover which resources have been allocated to it, and to prevent that driver from accessing resources that have been allocated to another process, multiple access resource discovery and allocation tables (e.g., MARDAT 225A, 225B, and 225C shown in FIG. 2) may be stored within storage 21. In addition, access check logic 23 may be configured to check access requests against the settings in the MARDAT 225, and to either grant or deny access to requested resources dependent on the MARDAT settings for the requesting process.

An I/O device such as the virtualized I/O device 20, for example, needs to be identified by the O/S, enumerated within the overall I/O device tree constructed by the O/S, allocated memory space, granted a unique access identification, provided interrupt mechanisms, and allocated various other resources to efficiently bind the service provided by the device into the overall system. Accordingly, a function is a hardware construct consisting of a set of purpose-specific registers built into an I/O device which standardizes the way a device presents its capabilities and resource requests to system software. Some of the registers may identify device capabilities and resource requests, while other registers may be used by S/W to allocate resources to the device. Additional registers may provide status and error management tools. A function provides this information and control capability in a standardized way independent of the service provided by the I/O device. Some non-virtualized I/O devices may have as few as one function, while a highly virtualized device may contain many functions, and may have a function allocated to each active system image sharing the device. A base address register (BAR) may be used by a function to indicate to the O/S when it reads the BAR the amount of memory space the application requires. Should the O/S grant that request, it writes into the BAR an address which represents the starting location within the overall address map where the O/S has allocated the address space needed by the application. The device driver affiliated with the function uses that as the base address to access resources contained within the device.

In addition, the functions may include both physical functions and a number of virtual functions that are associated with a given physical function in a hierarchical way. Each of the virtual functions also has a BAR, but the virtual function BARs may be accessed differently than the BAR of the physical function, which is described above. For example, the memory space for each second and subsequent virtual function is derived from the starting address of the first virtual function and the memory space aperture.

One or more functions may share the same hardware resource in some embodiments. As described further below in conjunction with the description of FIG. 2, in some implementations, a physical function that is associated with one or more virtual functions may have shared access to a hardware resource that has been allocated to the virtual functions. In such an implementation, it may be up to software to handle how the sharing of the resource takes place. For example, during initialization a given physical function may have sole access to a given hardware resource, and when an associated virtual function is enabled, the virtual function may assume the sole access to that resource. As such, the drivers or other software may perform some type of handshaking or other negotiation to control the transfer of access to the virtual function. Likewise, a similar negotiation may take place in cases in which the physical function may need to resume sole access of the resource.

Figure 2:
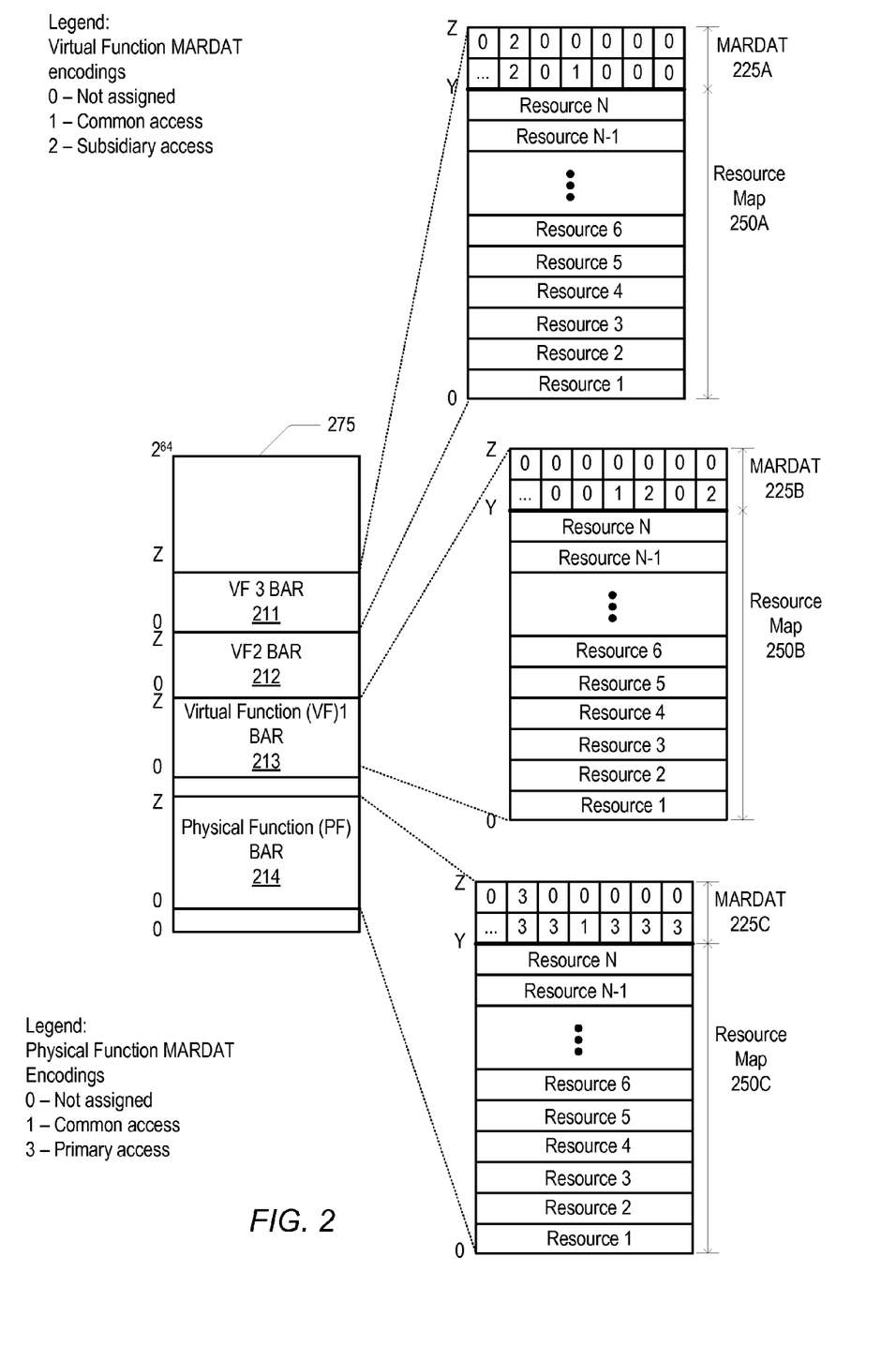
FIG. 2 is a diagram illustrating an embodiment of an I/O map and a corresponding resource discovery table created during resource allocation.

In one embodiment, the host interface 22 may support a number of functions including both physical and virtual functions. The hardware resources may be divided up among the functions in an arbitrary manner. However, in one embodiment, the resource allocation may be determined by the service processor 85. Each process executing on processors 30 may be associated with a device driver instance which may be configured to discover which resources have been allocated to the associated process and to access the resources when invoked by the process. As noted above, a function refers to an addressable entity in configuration space that may provide access to one or more hardware resources. As described further below, each function may be associated with one process, and therefore one device driver that corresponds to that process. However, it may be possible for a driver to be associated with a physical function and one or more associated virtual functions. In one embodiment, a number of resources may be allocated to a function based upon the base address register settings for that function. As shown in FIG. 2 and mentioned above, the resources that have been allocated to a given process/function pair may be indicated in the MARDAT 225.

Referring to FIG. 2, a diagram illustrating an embodiment of the data structures used in association with the virtualized I/O device 20 of FIG. 1 are shown. The I/O map 275 represents a conceptual illustration of how the functions within the virtualized I/O device 20 may be arranged in the system address space. The I/O map 275 includes a number of functions designated 211 through 214. Each function is associated with a process that may be running on, for example, one or both processors 30A and 30n of FIG. 1. In the illustrated embodiment, the address space of the I/O map 275 is shown to have a size of $2^{64}$ bytes. It is noted that in other embodiments that size of the address space for the I/O map 275 may be different. Within the I/O map 275, each function is shown to have 0-Z addressable locations. However, as described further below, only locations 0-Y may be directly addressable.

As shown in the exploded views of Physical Function (PF) BAR 214, Virtual Function (VF)1 BAR 213, and VF3 BAR 211 the resources maps 250C, 250B, and 250A, respectively, include a listing of hardware resources of the virtualized I/O device 20. In FIG. 2, each resource map 250, like the I/O map 275, is a conceptual illustration of the listing of resources that are potentially available to a given function. Each driver inherently knows where these resources are (i.e., the address in the address space defined by the I/O map 275) and of the particular resources allocated to a given process. The resource map 250 corresponds to locations 0-Y of each function BAR. It is noted that a particular resource listed in multiple resource maps 250 in FIG. 2 may be implemented as one hardware device that is accessible through multiple addresses. For example, resource 3 shown in each of resource maps 250A, 250B, and 250C may be one hardware resource which is "aliased" through three addresses.

As described above, resources that have been allocated to a given process are indicated in the MARDAT 225 associated with each function BAR. Each entry or location in the MARDAT 225 corresponds to a particular hardware resource. In addition, since all function BARs are part of the $2^{64}$-byte address space, each location/entry in the MARDAT 225 corresponds to a portion of the space contained within the BAR address space aperture. Thus when the encoded value in a given location in the MARDAT 225 indicates that a particular resource has been allocated to that process, the driver is informed of the address it must use to access that resource relative to the base address of the region specified in the BAR of the function that the driver was assigned. In the illustrated embodiment, the MARDAT 225A, MARDAT 225B, and MARDAT 225C each include two rows of some number of locations (as indicated by the ellipsis) for a total of M locations, where M may be representative of any whole integer number. In one embodiment, the encoded value indicates whether the resource in the resource map 250 that corresponds to that location has been allocated to the respective process, and what type of access has been allocated. For example, as shown in the MARDAT 225C, which is the MARDAT for a physical function, beginning from the right side of row Y, locations 0, 1, 2, 3, 4, 5, and M-2 have the values 3, 3, 3, 1, 3, 3, and 3 while the remaining values are zero. In the illustrated embodiment, those locations may correspond to resources 1, 2, 3, 4, 5, 6 and N-1. Similarly, within MARDAT 225B, locations 0, 1, 2, and 3 have the values 2, 0, 2, and 1, which may correspond to resources 1, 2, 3, and 4. As noted in the legends of FIG. 2, for a physical function, an encoded value of '0' corresponds to "not assigned," an encoded value of 1 corresponds to "common access," and an encoded value of 3 corresponds to "primary access." Similarly, for a virtual function, an encoded value of 0 corresponds to "not assigned," an encoded value of 1 corresponds to "common access," and an encoded value of 2 corresponds to "subsidiary access."

In one embodiment, common access refers to access to the resource that is shared among all functions to which the resource has been allocated. Primary access refers to access by a function such as a physical function, for example, that has sole access to a resource, while subsidiary access refers to access by a function such as a virtual function, for example, that may not have sole access, but may either negotiate for sole access, or may be granted sole access once it has been enabled.

Accordingly, the process associated with the PF in FIG. 2 has been allocated primary access for resources 1, 2, 3, 5, 6, and N-1, common access for resource 4 and no access for the remaining resources. Likewise, the process associated with the VF1 has been allocated common access to resource 4, subsidiary access to resources 1 and 3, and no access to the remaining resources. The process associated with VF3 has been allocated common access to resource 4, subsidiary access to resources 6 and N-1, and no access to the remaining resources.

As noted above, processes associated with functions that have been granted common access may be configured to handshake/negotiate between functions for access to the shared resource so that two or more functions do not have simultaneous access to the resource. In various embodiments, the negotiation process may be implementation specific. Similarly, processes associated with functions that have primary and subsidiary access to the same resource may be configured to handshake or otherwise negotiate for sole access to the resource.

It is noted that in other embodiments, other encoded values may be used to indicate the assignments, and that other assignments may be used. In addition, it is noted that additional encodings values may be used to indicate whether the respective process has read-only or both read and write privileges for a given resource. It is further noted that the embodiment shown in FIG. 2 is merely an exemplary assignment/allocation of functions and corresponding resources and that in other embodiments, other assignments and numbers of functions may be used.

As described above, each MARDAT 225 may be stored within storage 21 of the virtualized I/O device. As such, the host interface 22 and/or the access check unit 23 may access the MARDAT 225 to perform such tasks as allocation, discovery, and/or protection of resources as described further below in conjunction with the description of FIG. 3. Since the system inherently knows, or can calculate, where in the $2^{64}$-byte address space each function BAR is located, the memory manager may control access to specific addresses by a particular device driver, allowing access only to a device driver that has been assigned to the requested address space. In one embodiment, each MARDAT 225 is not accessible through a memory access. In such an embodiment, the host interface 22 may be solely responsible for reading the MARDAT 225 and providing a response to a device driver request.

Figure 3:
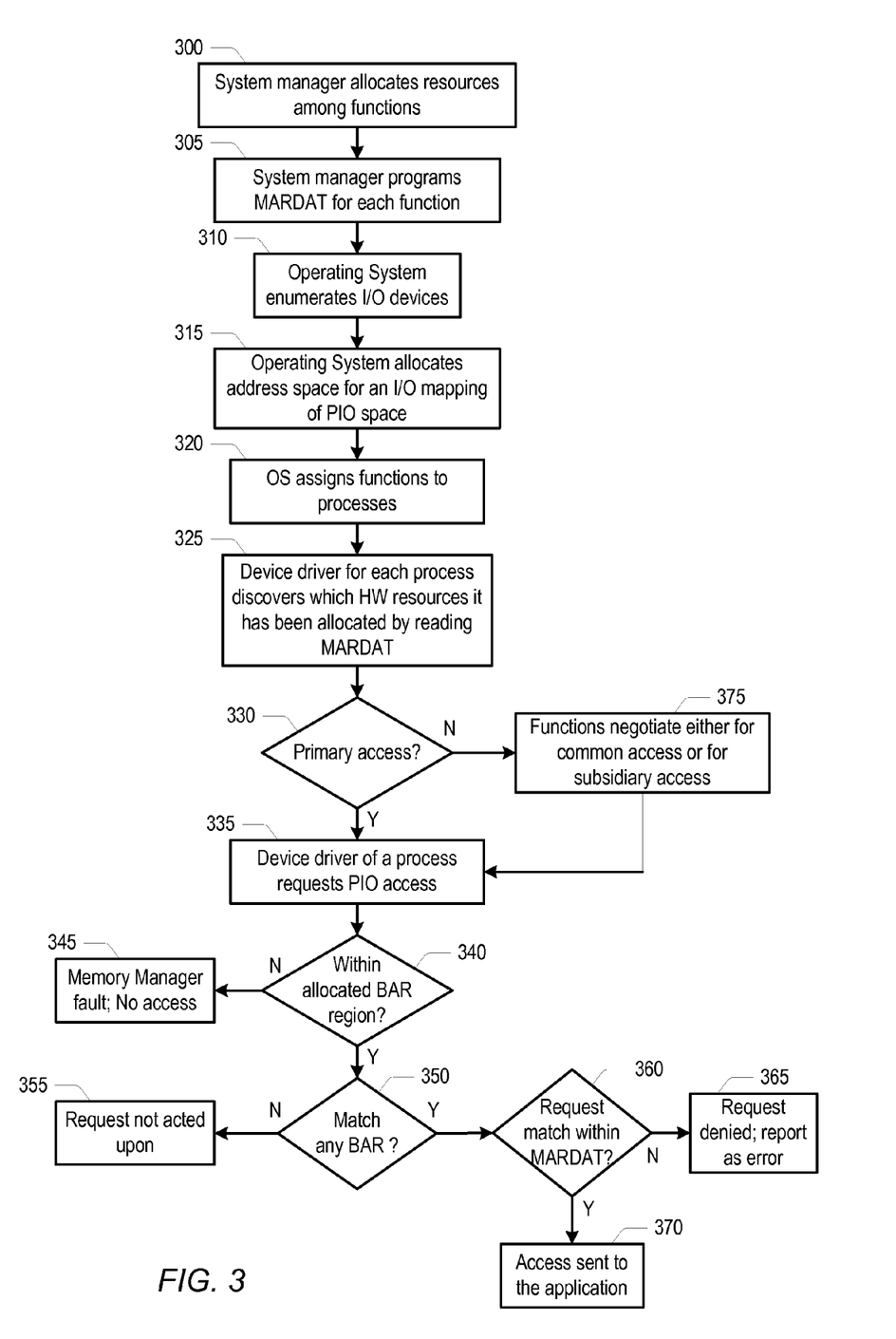
FIG. 3 is a flow diagram describing aspects of the discovery and protection of shared allocated resources within the virtualized I/O device shown in FIG. 1.

In FIG. 3, a flow diagram describing the operation of the embodiment of the computer system 10 of FIG. 1 is shown. Referring collectively to FIG. 1 through FIG. 3, the discovery and protection of I/O resources is described. Beginning with block 300, during system initialization, a system manager allocates resources among the functions. In one embodiment, the system manager may implemented as software executing on the service processor 85. However, it is contemplated that in other embodiments, the system manager may be implemented as software executing on another dedicated processor or processing unit that may be configured to allocate the system resources. Accordingly, as part of the allocation process, the system manager programs the MARDAT 225 for each function by, as described above, encoding a value into each location of the MARDAT 225 that corresponds to each allocated resource (block 305).

An operating system (OS) instance may enumerate the I/O devices in the system (block 310). In one embodiment, the enumeration process may include the OS identifying each I/O device and function in the system. The OS instance may build the I/O device tree, and allocate the address space for the functions such as those shown in the I/O map 275 (block 315). As shown in FIG. 2, the address space corresponding to the I/O map 275 may be broken up into a number of segments, each segment allocated to a function BAR for each physical function and each virtual function. The OS may then assign the functions to the various processes running on the processors 30A and 30n (block 320). In one embodiment, each function may be identified by a unique ID.

Each process may be associated with a respective device driver. In one embodiment, the device driver is an instance of device driver software that may be used by all the processes. The device driver may use read and write operations through load and store operations to discover and access the resources within the virtualized I/O device 20. Thus, a given device driver associated with a respective process may discover which resources have been allocated to that process (block 325). In one embodiment, a given device driver may initiate a read operation to the MARDAT 225 for the function to which the process has been assigned. As described above, the host interface 22 may access the appropriate MARDAT 225, and provide a response back to the driver. The response includes the hardware resources that have been allocated to the process, and the access type assigned to the process. The driver now has the addresses and information to access those resources.

However, as described above, the encoded values within the MARDAT 225 may indicate what type of access (e.g., primary, subsidiary, common) to a particular hardware resource a given function may have been allocated. Accordingly, if a function has not been given primary access (block 330), but has instead been given common access, for example, each function that shares the common access to that particular resource may negotiate for sole access to the resource. In addition, a physical function may at some point during an initialization phase, be given primary access to a resource. However, once a virtual function that is associated with the physical function and which has subsidiary access to that same resource is enabled, the virtual function may notify the physical function so that the corresponding process may negotiate for sole access to the resource (block 375).

Once the accessibility has been negotiated, the process which has sole access in the case of a shared resource, or the process which has primary access in the case of a non-shared resource may request access to the resource when necessary (block 335). Accordingly, when a given process needs to access the resources that it has been allocated, the device driver of that process requests a PIO access. The memory manager (e.g., MMU 31A) checks the address associated with the request to determine if the address is within the address range for the function BAR region that has been assigned to the requesting process (block 340). If the address is not within the address range for the assigned function BAR region, the memory manager will prevent the driver from accessing resources allocated to another process by generating a fault. The memory manager may drop the access request (block 345). However, if the address is within the address range for the assigned function BAR region, the memory manager will allow the access to proceed.

The host interface 22 may check the access request to ensure that the request matches a valid BAR within the virtualized I/O device 20 (block 350), and if not, the host interface 22 may not act upon the request, and then issue an "Unsupported Reques" (block 355). If the access request matches a BAR, the host interface 22 may access the MARDAT 225 of the function which contains the matching BAR. The contents of the MARDAT 225 may be inspected by the access check unit 23 to determine whether the device driver has been allocated the requested resources, and thus whether the access is permitted (block 360). If the access check unit 23 determines, using the contents of the MARDAT 225, that the access is not permitted, the requested access is denied (block 365). In one embodiment, the access check unit 23 may provide a deny signal as a flag that the request is an error. The flag may cause the virtualized I/O device to perform any type of error processing, as desired. Some examples of error processing may include generating one or more interrupts, completer abort by the PCIe, returning zeros in response to a read request, discarding a write request, and the like. Referring back to block 360, if the access check unit 23 determines that the access is permitted, the access is granted and the results sent back to the process (block 370).

It is noted the although the above embodiments show the virtualized I/O device coupled between processing units and a network, it is contemplated that in other embodiments, the virtualized I/O device may be a shared virtualized device used in any system. In such embodiments, the shared virtualized device may use the discovery and allocation mechanisms described above to allocate and share resources among a number of entities.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
a system manager software executing on a processor allocating hardware resources to a plurality of functions;
the system manager populating a resource discovery table for each function of the plurality of functions, wherein each resource discovery table includes a plurality of entries each corresponding to a respective hardware resource;
an operating system assigning one or more of the plurality of functions to a process executing on a processor;
a device driver associated with a given respective process discovering allocated resources by requesting a read access to the resource discovery table of the corresponding function;
wherein each entry of the resource discovery table includes an encoded value indicating whether a requested hardware resource has been allocated to the requesting process, and whether the requested hardware resource is shared with another function; and
the device driver storing results of the read access.

2. The method as recited in claim 1, further comprising the device driver performing a programmed input/output (PIO) request for access to the hardware resource.

3. The method as recited in claim 2, further comprising generating a fault in response to an address of the PIO resource request not being within an address region allocated to the associated requesting process.

4. The method as recited in claim 2, further comprising disregarding the PIO request in response to an address of a resource request being within an address region allocated to a requesting process, and not matching any base address register address.

5. The method as recited in claim 4, further comprising in response to an address of a resource request matching abase address register address, determining whether an access to the resource is permitted by inspecting the resource discovery table for the function corresponding to the matching base address register.

6. The method as recited in claim 5, further comprising in response to determining that an access to the resource is not permitted, generating an error and notifying the requesting process that the request has been denied.

7. The method as recited in claim 1, further comprising in response to determining that a requested hardware resource is shared with another function, one or more processes executing on the processor negotiating to determine which function is granted access to the hardware resource.

8. The method as recited in claim 1, further comprising the encoded value indicating a plurality of hardware access types including: not allocated, shared access, subsidiary access, and primary access.

9. A system comprising:
a virtualized input/output (I/O) device including:
one or more programmed I/O (HO) configuration registers corresponding to a plurality of hardware resources; and
a storage configured to store a resource discovery table that includes a plurality of entries, each entry corresponding to a respective hardware resource;
a system processor coupled to the virtualized I/O device and configured to execute system management instructions to:
allocate the plurality of hardware resources to a plurality of functions; and
program each entry of the resource discovery table for each function of the plurality of functions with an encoded value that indicates whether a requested hardware resource has been allocated to a requesting process, and whether the requested hardware resource is shared with another function;
a processing unit coupled to the virtualized I/O device and configured to execute instructions corresponding to one or more processes;
wherein the processing unit is further configured to execute instructions corresponding to a device driver instance associated with a given process to discover allocated resources by requesting a read access to the resource discovery table of the corresponding function.

10. The system as recited in claim 9, wherein given ones of the one or more processing units are further configured to execute instructions corresponding to the device driver to perform a programmed input/output (PIO) request for access to a given hardware resource.

11. The system as recited in claim 10, further comprising a memory management unit coupled to at least one of the one or more processors and configured to generate a fault in response to an address of the PIO resource request not being within an address region allocated to a requesting process.

12. The system as recited in claim 10, wherein the virtualized I/O device further includes a host interface configured to disregard the PIO request in response to an address of the PIO resource request being within an address region allocated to a requesting process, and not matching any base address register address.

13. The system as recited in claim 12, wherein the virtualized I/O device includes an access check unit configured to inspect the resource discovery table for the function corresponding to the matching base address register to determine whether an access to the resource is permitted.

14. The system as recited in claim 13, wherein in response to determining the access to the resource is not permitted, the host interface is configured to generate an error and to notify the requesting process that the request has been denied.

15. The system as recited in claim 9, wherein in response to determining whether a requested hardware resource is shared with another function, processes executing on the processor are configured to negotiate which function is granted access to the hardware resource.

16. The system as recited in claim 9, wherein in response to determining whether a given respective hardware resource is shared by more than one function, each such function uses a different address which aliases to the given respective hardware resource.

17. A virtualized input/output (I/O) device comprising:
a host interface;
a plurality of hardware resources coupled to the host interface;
a storage coupled to the host interface and configured to store a respective resource discovery table for each function of a plurality of functions;
wherein each resource discovery table includes a plurality of entries, wherein each entry corresponds to a respective hardware resource of the plurality of hardware resources, wherein each entry includes an encoded value;
one or more programmed I/O (PIO) configuration registers, each configured to store PIO configuration information corresponding to a respective process executing on a processing unit;
wherein the host interface is configured to receive from a device driver instance associated with a given process, a PIO request for read access to the resource discovery table of the corresponding function;
wherein the host interface is further configured to inspect the resource discovery table for the corresponding function to determine whether the requested hardware resource has been allocated to the requesting process, and whether the requested hardware resource is shared with another function based upon the encoded values in the entry corresponding to the requested hardware resource.

18. The device as recited in claim 17, wherein the host interface includes an access check unit configured to inspect the resource discovery table for the function corresponding to a matching base address register to determine whether an access to the resource is permitted.

19. The device as recited in claim 18, wherein in response to determining the access to the resource is not permitted, the host interface is configured to generate an error and to notify the requesting process that the request has been denied.

20. The device as recited in claim 17, wherein the encoded value includes a value to indicate one of the hardware resource is shared among all functions of the plurality of functions, the hardware resource is not allocated to the requesting process, the hardware resource is shared with an associated physical function, and the hardware resource is shared with an associated virtual function.

* * * * *